United States Patent
Mao et al.

(10) Patent No.: US 9,128,629 B1
(45) Date of Patent: Sep. 8, 2015

(54) THROTTLING TECHNIQUES FOR USE WITH DATA RELOCATION

(71) Applicant: EMC Corporation, Hopkinton, MA (US)

(72) Inventors: Qi Mao, Shanghai (CN); Ye Zhang, Shanghai (CN); Yining Si, Shrewsbury, MA (US); William C. Davenport, Burlington, MA (US); Alexander M. Daniel, Westford, MA (US); Pu Wang, Shanghai (CN); Chao Zheng, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 162 days.

(21) Appl. No.: 13/926,094

(22) Filed: Jun. 25, 2013

(51) Int. Cl.
*G06F 12/02* (2006.01)
*G06F 3/06* (2006.01)
*G06F 17/30* (2006.01)

(52) U.S. Cl.
CPC .............. *G06F 3/065* (2013.01); *G06F 3/0689* (2013.01); *G06F 17/30575* (2013.01)

(58) Field of Classification Search
CPC ............ G06F 11/1461; G06F 11/1458; G06F 11/3457; G06F 11/3419; G06F 17/30578; G06F 3/0635; G06F 2201/88; G06F 11/1471; G06F 11/3055; G06F 11/3476; G06F 11/3612; G06F 17/30212; G06F 3/0611; G06F 3/0689; G06F 11/2097; G06F 3/061; G06F 17/30575; G06F 17/30584
See application file for complete search history.

(56) References Cited

U.S. PATENT DOCUMENTS

| | | | | |
|---|---|---|---|---|
| 2008/0282048 A1* | 11/2008 | Miura | ............................. | 711/162 |
| 2010/0036952 A1* | 2/2010 | Hazlewood et al. | .......... | 709/226 |
| 2012/0079325 A1* | 3/2012 | Riegel et al. | ................. | 714/38.1 |

OTHER PUBLICATIONS

EMC, "EMC Fast VP for Unified Storage Systems," White Paper, 26 Pages, Oct. 2011.
Software Release by EMC Corporation, VNX Operating Environment (OE) Software for Block v05.32.000.5.006 and File v7.1.47.5, Jul. 16, 2012, see written description from https://community.emc.com/message/646744, 4 pages.

* cited by examiner

*Primary Examiner* — Hashem Farrokh
(74) *Attorney, Agent, or Firm* — Muirhead and Saturnell, LLC

(57) ABSTRACT

Techniques are described for copying data using a throttling mechanism to achieve a desired time delay. A request is received to copy a data portion from a source location of a first physical device to a target location of a second physical device. A desired average delay time is determined in accordance with a plurality of values including a throttle value affecting a rate at which data is copied from the source location to the target location. The request is partitioned into subrequests. The data portion is partitioned into a subportions. Each of the subrequests copies one of the subportions. The subrequests are performed whereby a time delay is introduced between at least two of the plurality of subrequests and whereby an average time delay with respect to each pair of consecutively issued subrequests is the desired average time delay.

20 Claims, 7 Drawing Sheets

| Performance level | Throttle | Delay time between two I/Os | Time to relocate 1GB slice |
|---|---|---|---|
| HIGH | 99 | 1 ms | at least 8192 milliseconds or 8.192 seconds |
| MEDIUM | 98 | 2 ms | at least 16,384 milliseconds or 16.384 seconds |
| LOW | 94 | 6 ms | at least 49, 152 milliseconds or 49.152 seconds |

FIG. 4

THROTTLING TECHNIQUES FOR USE WITH DATA RELOCATION

BACKGROUND

1. Technical Field

This application generally relates to data movement, such as data copying and/or relocation and techniques for controlling such operations.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives, and disk interface units. Such storage systems are provided, for example, by EMC Corporation of Hopkinton, Mass. The host systems access the storage system through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units, logical devices, or logical volumes (LVs). The logical disk units may or may not correspond to the actual disk drives. Allowing multiple host systems to access the storage system allows the host systems to share data stored therein.

In connection with a data storage system, and more generally any suitable system such as a computer system, it may be desirable and/or necessary to perform a data movement operation for any one of a variety of different purposes. It may be desirable to utilize techniques for controlling performance of such data movement operations to thereby limit resources utilized so as to limit adverse effects upon other tasks. For example, in a data storage system, it may be desirable to use such techniques to balance performing data movement operations with other operations such as received I/O requests or data operations received from hosts storing and retrieving data stored on the data storage system.

SUMMARY OF THE INVENTION

In accordance with one aspect of the invention is a method for copying data comprising: receiving a request to copy a data portion from a source location of a first physical device to a target location of a second physical device; determining a desired average delay time in accordance with a plurality of values including a throttle value affecting a rate at which data is copied from the source location to the target location; partitioning the request into a plurality of subrequests, the data portion being partitioned into a plurality of subportions, each of the plurality of subrequests copying one of the plurality of subportions; and performing the plurality of subrequests whereby a time delay is introduced between at least two of the plurality of subrequests and whereby an average time delay with respect to each pair of consecutively issued subrequests of the plurality of subrequests is the desired average time delay. The throttle value may be determined in accordance with a desired level of copying performance where the desired level of copying performance may be one of a plurality of performance levels that is user specified. The desired average time delay, delay time, may be determined as follows: delay time=A–(B*throttle), whereby A and B are numeric quantities such that A>B, throttle is the throttle value, and whereby A>(B*throttle). The plurality of performance levels may include three performance levels. The plurality of subrequests may include more than two subrequests and a first time delay may be introduced between only one pair of the plurality of subrequests to obtain the desired average time delay with respect to time delays introduced between subrequest pairs of the plurality of subrequests. The first time delay may denote an amount of time having a first time granularity and the desired average time delay may have a second time granularity, the first time granularity being larger than the second time granularity. The first time delay may be larger than the desired average time delay. The request may be a request to relocate data in connection with a data movement optimization performed in accordance with a current workload of the data portion. The data movement optimization may be performed in a data storage system including a plurality of different storage tiers having different performance characteristics. The data movement optimization may be a promotion whereby the source device is included in a first of the plurality of storage tiers having a lower performance classification ranking than a second of the plurality of storage tiers including the target device. The data movement optimization may be a demotion whereby the source device is included in a first of the plurality of storage tiers having a higher performance classification ranking than a second of the plurality of storage tiers including the target device. The method may further comprise issuing a first of the plurality of subrequests, determining an interval time as an amount of time that has elapsed since issuing the first subrequest, determining a requested time delay amount in accordance with the desired average delay time, the interval time, and an adjust time, the adjust time denoting any accumulated overage or underage in actual delay time introduced between previously issued subrequests of the plurality of subrequests, determining whether the requested time delay amount is greater than zero, and responsive to determining the requested time delay amount is greater than zero, issuing a delay request to introduce a time delay of the request time delay amount prior to issuing a second of the plurality of subrequests, and otherwise not issuing a delay request to introduce a time delay prior to issuing a second of the plurality of subrequests. The method may also include determining an updated values for the adjust time, wherein if the delay request is issued, the updated value is equal to a difference between the requested time delay amount and an actual amount of time delay introduced as a result of the delay request, wherein if the delay request is not issued, the updated value is equal to the requested time delay amount. If the adjust time at a point in time is negative, the adjust time may denote an overage in actual delay time already introduced between subrequest prior to the point in time whereby the overage is carried forward in connection with determining whether to request a time delay prior to issuing a next subsequent one of the plurality of subrequests. If the adjust time at a point in time is positive, the adjust time may denote an underage or deficiency in actual delay time that has not been introduced prior to the point in time whereby the underage or deficiency is carried forward in connection with determining whether to request a time delay prior to issuing a next subsequent one of the plurality of subrequests and in connection with determining an amount of time delay to request prior to issuing a next subsequent one of the plurality of subrequests. The copying data may be performed as a background task in a data storage system, the background task having a lower priority than one or more other tasks, the one or more other tasks including servicing I/O requests received at the data storage system from one or more hosts.

In accordance with another aspect of the invention is a computer readable medium comprising code stored thereon for copying data, the computer readable medium comprising code for: receiving a request to copy a data portion from a source location of a first physical device to a target location of a second physical device; determining a desired average delay time in accordance with a plurality of values including a throttle value affecting a rate at which data is copied from the source location to the target location; partitioning the request into a plurality of subrequests, the data portion being partitioned into a plurality of subportions, each of the plurality of subrequests copying one of the plurality of subportions; and performing the plurality of subrequests whereby a time delay is introduced between at least two of the plurality of subrequests and whereby an average time delay with respect to each pair of consecutively issued subrequests of the plurality of subrequests is the desired average time delay. The throttle value may be determined in accordance with a desired level of copying performance. The desired level of copying performance may be one of a plurality of performance levels that is user specified. The desired average time delay, delay time, may be determined as follows: delay time=A− (B*throttle), whereby A and B are numeric quantities such that A>B, throttle is the throttle value, and whereby A>(B*throttle), and wherein the plurality of performance levels includes three performance levels.

In accordance with another aspect is a system comprising: one or more hosts which send I/O requests to a data storage system; and the data storage system including a set of one or more processors programmed to perform processing for copying data, the processing including: receiving a request to copy a data portion from a source location of a first physical device to a target location of a second physical device; determining a desired average delay time in accordance with a plurality of values including a throttle value affecting a rate at which data is copied from the source location to the target location; partitioning the request into a plurality of subrequests, the data portion being partitioned into a plurality of subportions, each of the plurality of subrequests copying one of the plurality of subportions; and performing the plurality of subrequests whereby a time delay is introduced between at least two of the plurality of subrequests and whereby an average time delay with respect to each pair of consecutively issued subrequests of the plurality of subrequests is the desired average time delay.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is a table of exemplary values that may be used in determining desired average time delays in an embodiment in accordance with techniques herein;

DETAILED DESCRIPTION OF EMBODIMENT(S)

Figure 1:
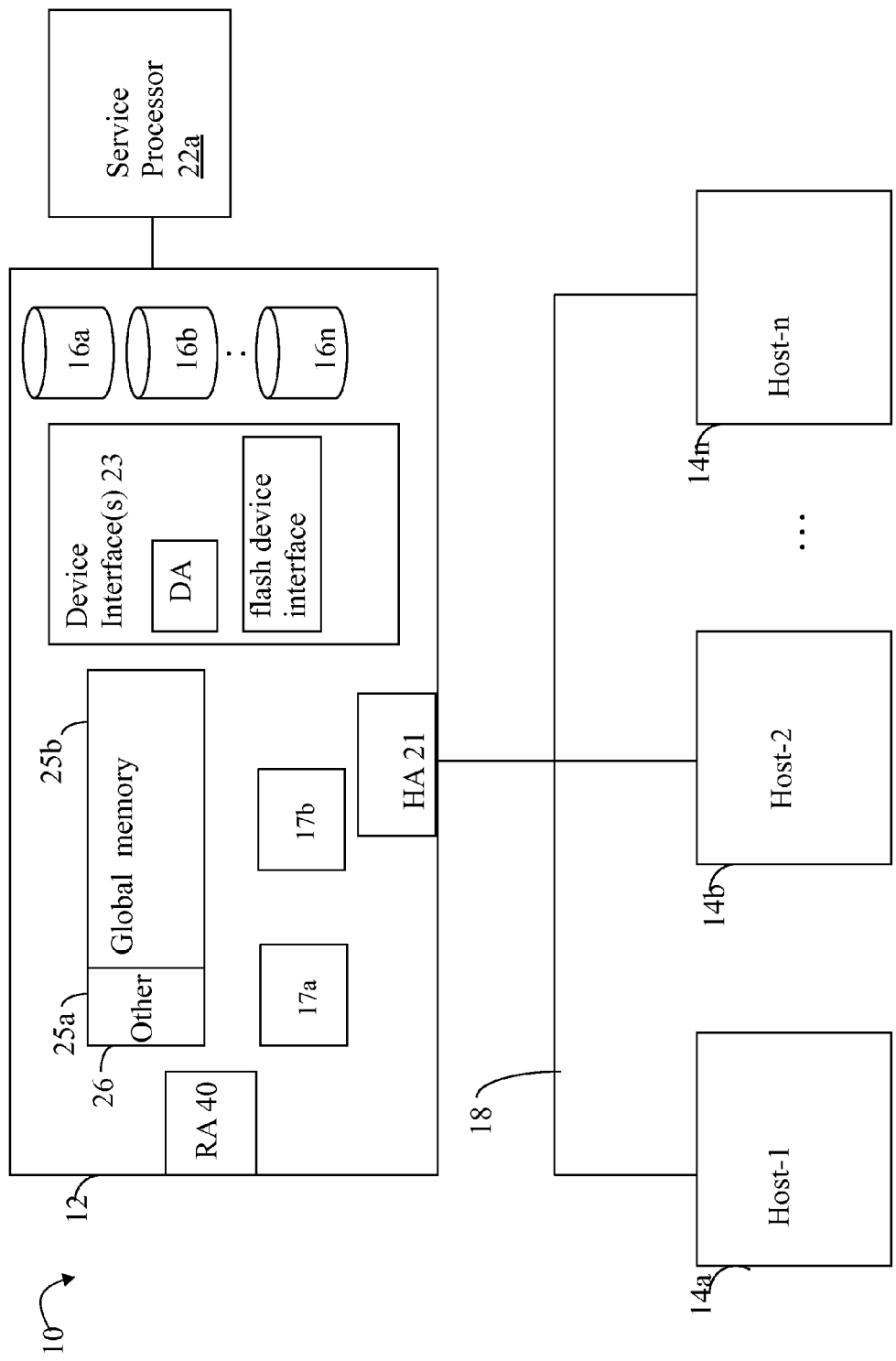
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system may be a single unitary data storage system, such as single data storage array, including two main storage processors or computer processing units (CPUs). Techniques herein may be more generally use in connection with any one or more data storage system each including a different number of main processors than as illustrated herein. The data storage system 12 may be a data storage array, such as a VNX™ data storage array by EMC Corporation of Hopkinton, Mass., including a plurality of data storage devices 16a-16n and two main storage processors or CPUs 17a, 17b. The processors 17a, 17b may be CPUs included in the data storage system for processing requests and commands. In connection with performing techniques herein, an embodiment of the data storage system may include multiple main storage processors including more than two main CPUs as described. The VNX™ data storage system mentioned above may include two main processors 17a, 17b for performing processing in connection with servicing requests such as, for example, received from hosts or other clients of the data storage system. Additionally, the two storage processors or CPUs 17a, 17b may be used in connection with failover processing such as when communicating with the service processor 22a described elsewhere herein in more detail.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, volumes, or logical units (LUNs). The LUNs may or may not correspond to the actual physical devices or drives 16a-16n. For example, one or more LUNs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

The device interface, such as a DA, performs I/O operations on a drive 16a-16n. In the following description, data residing on an LUN may be accessed by the device interface following a data request in connection with I/O operations that other directors originate. Data may be accessed by LUN in which a single device interface manages data requests in connection with the different one or more LUNs that may reside on a drive 16a-16n.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12. It should also be noted that although 22a is illustrated as being external to the data storage system, it may alternatively be located internal within the data storage system.

With reference to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes or properties. The attributes may include any one or more of a storage type or storage technology, device performance characteristic(s), RAID configuration (e.g., RAID-0, RAID-1, RAID-5, RAID-6), storage capacity, and the like. The storage type or technology may specify whether a physical storage device is an SSD drive (such as a flash drive), a particular type of SSD drive (such using flash or a form of RAM), a type of rotating magnetic disk or other non-SSD drive (such as an FC disk drive, a 10K RPM FC disk drive, a 15K RPM FC disk drive, a SATA (Serial Advanced Technology Attachment) drive), SAS (Serial Attached SCSI), and the like. Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. In terms of general expected performance, the SSD or flash tier may be considered the highest performing tier. The FC drives may be considered the second or next highest performing tier and the SATA drives may be considered the lowest or third ranked tier in terms of expected performance. The foregoing are some examples of tier definitions and other tier definitions may be specified in accordance with techniques herein.

A storage pool may be defined as a logical group of physical devices. In an embodiment in accordance with techniques herein, a logical device or unit, such as a LUN, may be configured from physical devices of a storage pool. A storage pool may be homogenous (including physical devices having the same technology or drive type such as all SATA rotating disk drives, all FC rotating disk drives, and the like). A storage pool may also be heterogeneous including multiple different tiers of physical devices of different drive technologies and types (e.g., includes SATA and FC rotating disk drives). One or more LUNs may be created from a single storage pool whereby different data portions of a single LUN may be located on different physical devices of the pool. Furthermore, such different data portions of the single LUN may be stored on different physical devices of different storage tiers as described in more detail in following paragraphs. A LUN or other logical device having storage provisioned from a storage pool may be any suitable type of logical device or entity supported in an embodiment. For example, a LUN may be a thin or virtually provisioned LUN, a thick or regular LUN, and the like. Generally, a thick or regular LUN may have storage provisioned for the entire LUN's capacity when the LUN is created. In other words, storage may be allocated from the pool for the LUN's entire logical address space when the LUN is created. In contrast, thin or virtually provisioned (VP) LUNs use a capacity on demand model whereby storage may not be provisioned for the entire LUN's address space when the LUN is created. Rather, storage may be provisioned for a portion of the LUN's address space when there is an initial write to the logical address space. The granularity or the amount of storage provisioned at a time for virtually provisioned LUN may vary with embodiment. Thus, at any point in time, not all portions of the logical address space of a virtually provisioned LUN may be associated or mapped to allocated physical storage depending on which logical addresses of the virtually provisioned LUN have been written to at a point in time. In one embodiment, a storage pool may include different multiple storage tiers comprising physical devices of different drive technologies. For example, as described in more detail elsewhere herein, a storage pool may include 3 tiers of physical devices whereby a first tier includes SSD drives, a second tier includes FC rotating disk drives, and a third tier includes SATA rotating disk drives. In one such embodiment, all physical devices in the storage pool may be configured to have the same RAID level.

Figure 2:
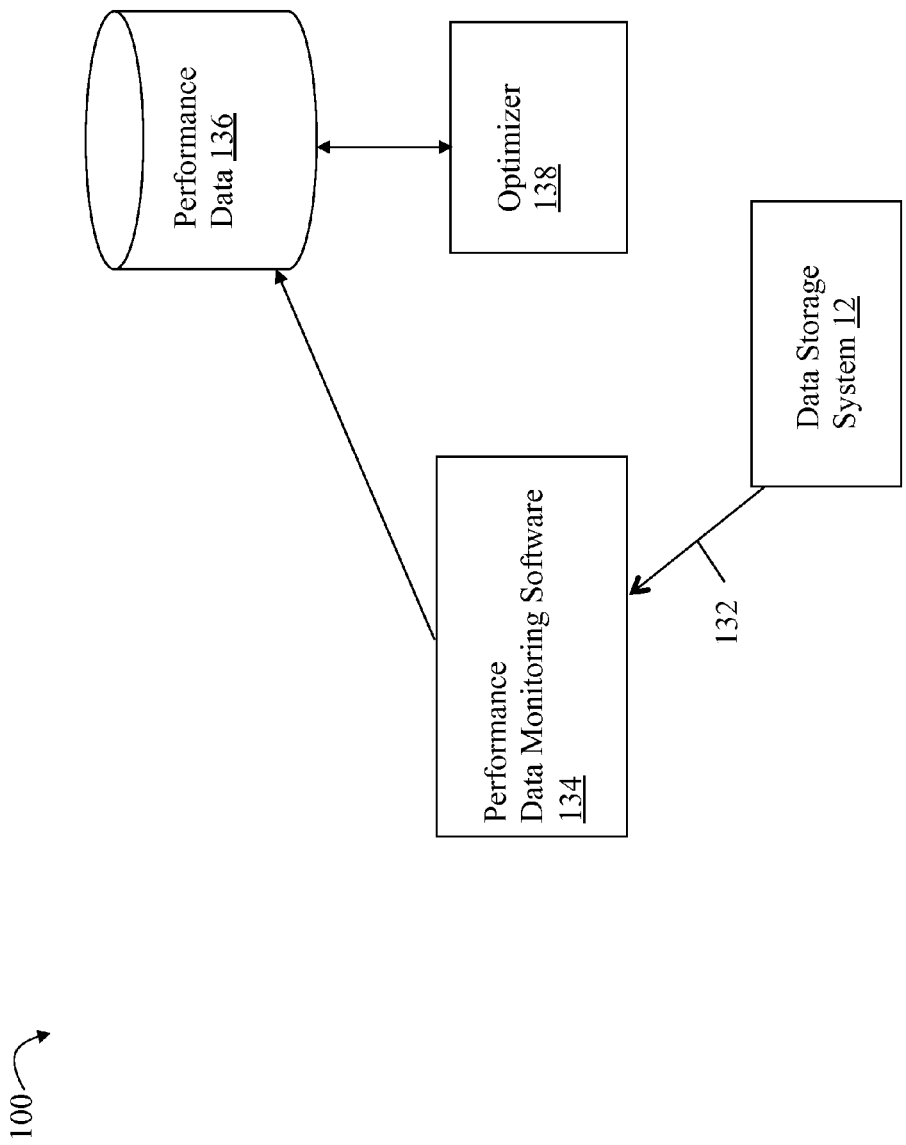
FIG. 2 is an example of components that may be used in an embodiment to collect performance data used in determining data portions to be relocated between storage tiers in accordance with techniques herein.

Referring to FIG. 2, shown is an example 100 of software that may be used in connection with techniques herein. One or more of the components and associated functionality illustrated in FIG. 2 may be located on the service processor 22a, data storage system and/or embodied in any other suitable physical component(s). It should be noted that the service processor may be any one of a variety of commercially available processors, such as an Intel-based processor, and the like. For example, elements 134, 138 and 136 may be included in the service processor 22a in one embodiment.

The example 100 includes performance data monitoring software 134 which gathers performance data 136 about the data storage system 12 through the connection 132. The performance data monitoring software 134 gathers and stores performance data 136 which is input to the optimizer 138. This performance data 136 may serve as an input to the optimizer 138 which attempts to enhance the performance of I/O operations, such as those I/O operations associated with data storage devices 16a-16n of the system 12. The optimizer 138 may take into consideration various types of parameters and performance data 136 in an attempt to optimize particular metrics associated with performance of the data storage system 12. The performance data 136 may be used by the optimizer to determine metrics characterizing the workload or activity of data portions as may be used in an embodiment in accordance with techniques herein. The optimizer may access the performance data, for example, collected for a plurality of logical devices when performing a data storage optimization. The performance data 136 may be used in determining a workload for one or more physical devices, logical devices (e.g., LUNs), portions of logical devices (e.g., gather performance data and determine workload or level of activity for granularity that is less than an entire logical device), and the like. For example, in one embodiment, the data storage optimizer may perform data movement optimization based on the dynamically changing workload of data portions which are 1 GB slices or data portions. In this manner, the optimizer may determine workload for each such slice (slice-level granularity) and may perform data movement in slice units or other suitable size granularity. The workload may also be a measurement or activity level of "how busy" a device (or data portion thereof) is, for example, in terms of I/O operations (e.g., I/O throughput such as number of I/Os/second, response time (RT), average data transfer rate (e.g., bytes/second), and the like).

It should be noted that a slice or data portion size of 1 GB is merely an exemplary size that may be used in an embodiment in accordance with techniques herein. As will be appreciated by those skilled in the art, an embodiment may use a smaller slice size such as, for example, 256 megabytes, as well as any other suitable size.

The response time for a storage device or volume may be based on a response time associated with the storage device or volume for a period of time. The response time may be based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the operations of read and write with respect to a logical or physical device may be viewed as read and write requests or commands from the DA 23, controller or other backend physical device interface. Thus, these operations may also be characterized as a number of operations with respect to the physical storage device (e.g., number of physical device reads, writes, and the like, based on physical device accesses). This is in contrast to observing or counting a number of particular types of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an HA 21.

The optimizer 138 may perform processing to determine which data portions of one or more applications to locate on physical storage devices in a multi-tiered environment. It should be noted that the optimizer 138 may generally represent one or more components that perform processing as described herein as well as one or more other optimizations and other processing that may be performed in an embodiment. The optimizer 138 may, more generally, be referred to as a data movement module which provides for movement of data between storage tiers in accordance with data movement criteria. Generally, the optimizer may locate the most active data portions in the highest performance tiers and the less active data to lower performance tiers. As the activity or workload of data portions change over time, the optimizer may gather updated performance data reflecting such changes in workload and accordingly relocate data portions as needed based on such workload changes. For example, at a first point in time, a first data portion may have a first workload or activity level which is higher than a second workload or activity level of a second data portion. At the first point in time, the optimizer may locate the first data portion on a flash-based tier also referred to herein as an EFD (enterprise flash drive) tier and the second data portion on a lower performing FC or SATA tier. At a second later point in time, the workload of both the first and second data portions may change so that the first data portion now has approximately the second workload or activity and the second data portion has approximately the higher first workload or activity. At the second point in time, the optimizer may perform a data movement optimization based on this change in workload and move or relocate the first data portion to the FC or SATA tier and also move or relocate the second data portion to the EFD tier.

Thus, generally, the optimizer may gather data or statistics providing a measure of the activity or workload of a data portion. The optimizer may collect such data and perform analysis of the workload or activity of the data portions at various points in time, such as once per hour, to determine a ranking of the data portions in terms of activity relative to other data portions (for the same and different LUNs) of the pool. The data storage optimizer may provide for automatic relocation and data movement of data portions to different storage tiers in the pool based on data movement criteria and policies that may be included in an embodiment. For example, a policy option of automated tiering may be specified on a per LUN basis so that data portions of the LUN are located to different storage tiers based on the foregoing activity ranking. For example, the "hottest" or most active portions of the LUN having the highest workload are located in the highest performing available tier while placing portions of the LUN with lower activity on the lower performing tiers. The foregoing is one such policy that may be in effect for a LUN as may be included in an embodiment. It should be noted that an embodiment may also include one or more other policy options that may be specified for each LUN affecting where data of the LUN is located or placed. An embodiment may use a data storage optimizer such as, for example, EMC® Fully Automated Storage and Tiering for Virtual Pools (FAST VP) by EMC Corporation, providing functionality as described herein for such automated evaluation and data movement optimizations.

Data portions of a LUN may be initially placed or located in a storage tier based on an initial placement or allocation policy. Subsequently, as data operations are performed with respect to the different data portions and data collected, data portions may be automatically relocated or placed in different storage tiers having different performance characteristics as the observed workload or activity of the data portions change over time.

Thus, the data storage optimizer may move or relocate data portions between different storage tiers having particular performance characteristics based on the activity of the data portions. The data movement module may perform processing to determine in which storage tier to locate data portions based on criteria. The criteria may include performing data movements between different storage tiers based on, for example, activity level or workload of the data portions at different points in time, overall performance of the data storage system, performance of one or more storage tiers, and the like. For example, the most active or busiest portions of a LUN may be stored on the highest performing tiers.

Figure 3:
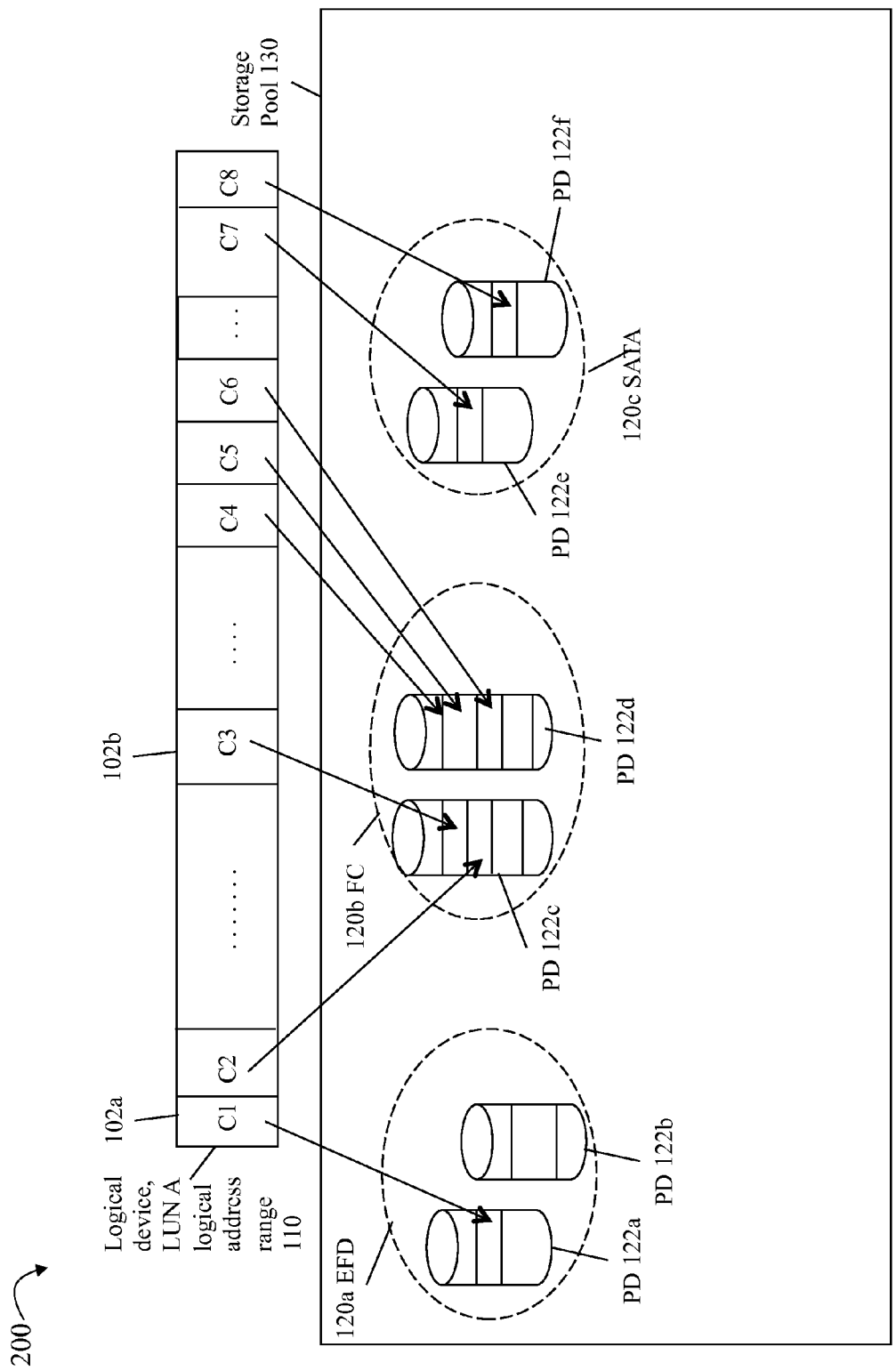
FIGS. 3 and 3A are examples illustrating mapping portions of a logical device having storage provisioned from a pool in an embodiment in accordance with techniques herein.

Referring to FIG. 3, shown is an example of a storage pool including a plurality of storage tiers as may be used in connection with techniques herein. The example 200 includes a storage pool 130 including physical devices (PDs) 122a-122f of 3 different storage tiers 120a-120c. In this example, each storage tier may be characterized by multiple attributes or properties including a first attribute denoting the drive type or technology as one of EFD, FC or SATA. Additionally, each of the different storage tiers may be configured in any suitable RAID configuration. For purposes of simplicity of illustration as in FIG. 3, each storage tier of different drives may be configured in a mirroring arrangement such as denoted by RAID-1, without parity or striping) whereby data is written identically to two drives producing a "mirrored set". A read request may be serviced by either of the two drives containing the requested data, and a write request updates the copy of the data on both drives.

In this example, the 3 storage tiers in the pool 130 may include: tier 120a of EFD devices PDs 122a-b, tier 120b of FC PDs 122c-d, and tier 120c of SATA PDs 122e-f.

Element 110 may represent a logical address range of a logical device, such as a LUN A, configured from the pool 130 denoting where different portions of data of the logical address range are physically stored on devices in the storage pool 130. Each of the square units or elements, such as 102a and 102b, included in 110 may denote a data portion, such as a slice or other appropriately sized portion of the logical address space of LUN A. LUN A may be a thick or virtually provisioned device. If LUN A is a thick device, each portion of the logical address space 110 may be mapped to a portion of physical storage. If LUN A is a virtually provisioned device, each portion of the logical address space 110 may or may not be mapped to a portion of physical storage depending on whether any data has been stored or written to the logical address space portions. For purposes of illustration, assume that LUN A is a thick or thin (e.g., virtually provisioned) LUN having storage allocated for all its data portions even though such mapping is only denoted for some particular data portions denoted C1-C8.

At a first point in time, data portions C1-C8 may be located on different PDs of the different storage tiers as illustrated in 200. For example, data portion C1 may be located in the EFD tier 120a, data portions C2-C6 may be located in the FC tier 120b and data portions C7 and C8 may be located in the SATA tier 120c. It should be noted that all portions of 110 may be initially mapped to physical storage in pool 130 although such mapping is only illustrated for portions C1-C8 for simplicity in illustration.

It should also be noted that although this example illustrates only a single LUN A having storage allocated from the pool 130, multiple LUNs may simultaneously have their physical storage similarly allocated from the same PDs of the same storage pool 130.

Thus, FIG. 3 may represent a mapping of where data portions corresponding to the LUN A's logical address space are located (e.g., in what storage devices of what storage tiers) at a first point in time.

After a time period, information regarding the activity or workload of the data portions of LUN A may be obtained based on gathered data as described elsewhere herein. Based on the activity or workload of the data portions at a second later point time, one or more of the data portions of LUN A may be relocated or moved to a different storage tier than as illustrated in FIG. 3 at the first point in time. In accordance with techniques herein, such data movement or relocation may be based on criteria including the workload or activity of the data portions. In this manner, the data storage optimizer may, for example, perform data movement optimizations to move or relocate data portions of LUN A based on the changing workload of such data portions. Such data portions may be moved between different ones of storage tiers 120a-120c providing for data movement optimization based on changing data portion workloads of the different data portions. For example, at the second point in time, the workload of data portion C8 may greatly increase and the data storage optimizer may perform processing to relocate data of C8 on a PD of the EFD tier 120a.

It should be noted that in connection with data movement optimizations, a portion of data may be promoted whereby the data is copied from a source location of a source physical device in a first storage tier to a target location of a target physical device in a second storage tier, the second storage tier being a higher performance tier than the first storage tier. For example, an embodiment may have 3 storage tiers, having a performance ranking or classification, from highest performance to lowest performance, as follows—EFD, FC rotating disk drives and SATA rotating disk drives. A promotion may be a data movement from a lower performance tier to any higher performance tier (e.g., movement of data from SATA or FC to EFD, movement of data from SATA to FC). A portion of data may be demoted whereby the data is copied from a source location of a source physical device in a first storage tier to a target location of a target physical device in a second storage tier, the second storage tier being a lower performance tier than the first storage tier. For example, an embodiment may have 3 storage tiers, having a performance ranking or classification, from highest performance to lowest performance, as follows—EFD, FC rotating disk drives and SATA rotating disk drives. A demotion may be a data movement from a higher performance tier to any lower performance tier (e.g., movement of data from EFD to either SATA or FC, movement of data from FC to SATA). Responsive to a workload of a data portion greatly decreasing from a first point in time (when the data portion is stored on a first higher performance tier) to a second later point in time, the data portion may be relocated at the second point in time to the second lower performance tier. Responsive to a workload of a data portion greatly increasing from a first point in time (when the data portion is stored on a first lower performance tier) to a second later point in time, the data portion may be relocated at the second point in time to a second higher performance tier. An embodiment may perform data movement optimizations that include promotions and/or demotions based on the workloads of the different data portions. An embodiment may place the most active data portions having the heaviest workload or activity on the highest performing tiers and may place the least active or coldest data portions having the smallest workload on the lowest performance tier. As the I/O workload characteristics of a data portion dynamically change over time as may be observed through analyzing collected workload data, processing may be performed to accordingly move or relocate data portions to suitable storage tiers in accordance with changing workloads of the data portions.

Figure 3A:
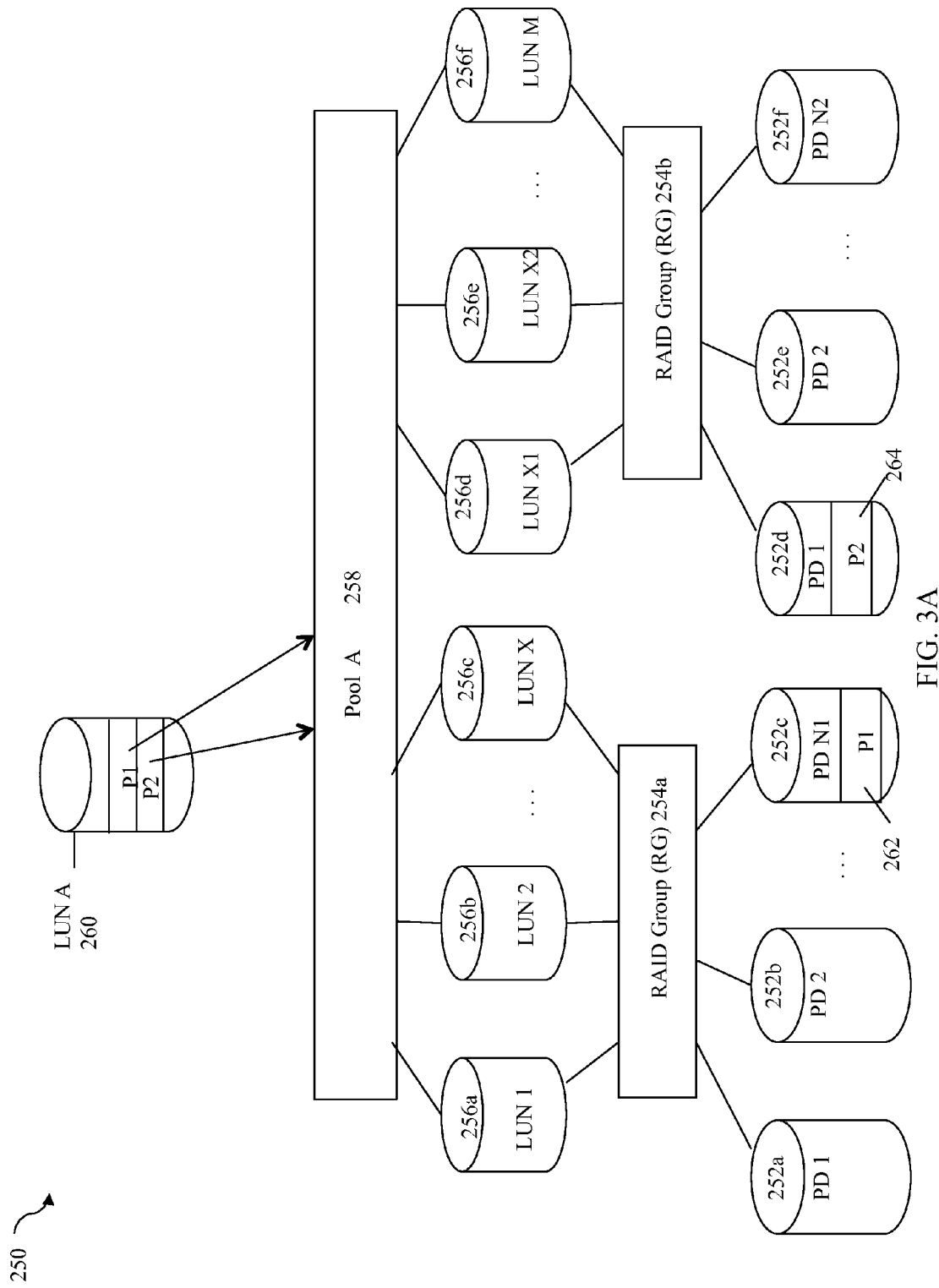

Referring to FIG. 3A, shown is an example 250 illustrating in more detail how a storage pool A 258 may be configured in an embodiment in accordance with techniques herein. The example 250 illustrates a storage pool 258 that includes PDs 252a-252f comprising the one or more storage tiers as described above. The PDs 252a-f may be configured into one or more RAID groups such as illustrated by 254a-b. As will be appreciated by those skilled in the art, the number of PDs in each RAID group may vary with the particular RAID level and configuration. A first level of logical devices illustrated by LUNs 256a-f may be configured from the RAID groups 254a-b whereby the LUNs 256a-f are included in the pool 258. A second level of one or more logical devices such as illustrated by LUN A 260 may be configured to have storage provisioned from the pool A 258. The LUN A 260 may be, for example, a thick LUN or a virtually provisioned thin LUN presented to the host or other client. The LUN A 260 is illustrated as including two data portions P1 and P2 which may be mapped, respectively, through the different logical entities and levels illustrated in 250 to physical device locations 262 and 264. The example 250 is one way in which a pool 258 may be configured from which one or more LUNs such as 260 may have storage provisioned.

What will now be described in the context of a data storage system are techniques that may be used in connection with performing data movement or relocation such as in connection with automatically relocating a data portion within PDs of a storage pool in connection with performing data storage movement optimizations to improve data storage system performance. It should be noted that techniques described in following paragraphs may be generally used in connection with copying data from a physical source location to a physical target location whereby data relocation for data storage optimization purposes is merely one exemplary use of such techniques.

As described above in connection with relocating data, an embodiment may have a data movement level of granularity that is the size of a data portion such as a slice of data that is 1 GB in size. In such an embodiment, the copy or relocation processing may operate at a smaller, different level of granularity whereby the data portion is further subdivided into smaller partitions, such as 128B byte subportions. Each subportion may be copied by issuing a copy request or operation within the data storage system. Thus, to relocate a 1 GB data portion, 8192 I/Os or data copies may be performed whereby each data copy copies 128K bytes (e.g., 1G/128K=8192 IOs).

An embodiment may use a throttle mechanism to control the processing rate, or more generally, the amount of resources allocated to performing the relocation of data such as in connection with data movement optimizations. Failure to use such a throttling or other mechanism to balance system resources between relocation processing and other processing such as in connection with servicing received I/O requests may adversely impact system performance such as response time in connection with servicing I/O requests. In one embodiment as described herein, such relocation processing or I/Os issued in connection with data copying may be performed as a lower priority background operation. Other data storage system processing such as for servicing received host I/O requests to read and/or write data may have a higher relative priority than performing I/Os for data copying or relocating data between storage tiers in connection with a data storage movement optimization.

One type of control mechanism may implement the data copy control by limiting the number of concurrent or outstanding data copy I/O operations in the system when relocating a data portion, such as a slice of data. For example, a number of data copy I/Os (each copying 128K bytes or some other amount of data as mentioned above) may be initiated simultaneously at a first point in time. Once all such I/Os are done, a new batch of I/Os may be issued. However, it may be difficult for a data storage administrator to determine a suitable number of such data copy I/Os to thereby limit or control the resources of the system utilized to perform the data copying. Additionally, having a control mechanism that just solely limits the number of concurrent or outstanding data copy I/Os at each point in time may not sufficiently limit the possible adverse impact upon other higher priority processing such as for servicing received I/O requests. For example, let the number of concurrent or outstanding data copy I/O operations be set to 1. In this case, the data copying for relocation may be performed sequentially one 128K bytes sub portion at a time. However, without any additional control criteria, data copy I/Os performed for relocation processing may still adversely and unacceptably impact servicing I/O requests having a higher priority. For example, if a contiguous sequence of data copy I/Os are performed without intervening user data I/O requests, the cache may become full of data associated with the copy I/Os thereby forcing out cached user data I/O requests. In this manner, subsequently resuming servicing user data I/O requests may result, for example, in an unacceptable level of cache read misses since such previously cached data used to service user I/O requests may no longer be in cache.

Thus, an embodiment in accordance with techniques herein may utilize a control or throttle mechanism which introduces a time delay, (e.g., such as between two copy I/Os performed for copying subportions of a data slice in connection with data relocation) to limit system resources used for the lower priority processing of copy I/Os for relocating a data portion. Such techniques may introduce different time delays between copy I/Os to meet average time delay criteria whereby the average time delay desired may be less than the minimum delay granularity that can be obtained when only considering a single time delay introduced between two copy I/Os. In other words, techniques herein may consider multiple time delays in the aggregate to achieve a desired average time delay whereby the desired average time delay may be less than the minimum single time delay that can be introduced between two copy I/Os. In this manner, techniques herein may be used to obtain accurate and fine granularity of time delay control in connection with throttling or controlling the copy I/O processing such as for relocating data in connection with a data movement optimization or other application. Such techniques provide for performing the copy I/Os for relocating data which limiting resource consumption used for such low priority copy I/Os while also limiting the adverse impact upon higher priority operations, such as servicing I/O requests for user data as may be received from a host.

In following paragraphs, processing may be performed to relocate a single 1 GB slice of data that is further partitioned into smaller sub portions so that relocating the 1 GB slice may be partitioned into multiple copy I/Os each of which copies a sub portion of the slice, or more generally, data portion, being relocated. Particulars such as the amount of data copied by a single copy I/O (e.g., 128 K bytes), the size of the data portion being copied (e.g., 1 GB slice), and the like, may vary with embodiment and the particular values provided herein are for purposes of illustration and example. Generally, as will be appreciated by those skilled in the art, a data portion may be partitioned into a plurality of smaller sub portions each of which may be copied by a single I/O request generated internally within the data storage system as part of processing performed to relocate the data portion.

The automated storage tiering and data movement optimizations as described herein may be performed as one exemplary use of techniques herein. Generally, techniques herein provide for pacing the rate at which copy I/Os are performed for data relocation to limit adverse impact upon other higher priority operations, such as for servicing user data I/O requests received from a host.

At times, it may be desirable to introduce a desired time delay between two copy I/Os whereby the system has a minimum time granularity that is larger than the desired time delay. In other words, the smallest time unit available for performing time delays on the system may be more than the desired time delay. For example, one or more of the Windows™-based operating systems by Microsoft Corporation may have a minimum time delay granularity of 15 ms (milliseconds) and it may be desirable to introduce a smaller time delay, for example, of 5 ms between two copy I/Os. In accordance with techniques herein as described in more detail below, processing may be performed which considers multiple time delays introduced so as to obtain the desired time delay of 5 ms as an average time delay across, or with respect to, multiple time delays. As described below, multiple time delays of different amounts may be introduced between copy I/Os so that the desired time delay is obtained or approximated as an average of such multiple time delays introduced between copy I/Os.

Techniques herein provide for averaging time delays between multiple pairs of consecutively issued copy I/Os to implement a desired fine grain time delay (e.g., 5 ms) using a coarser or larger grain timer (e.g., whereby the system may provide for time delays in atomic units of 15 ms whereby there may be a minimum delay of 15 ms). For example, if an embodiment desires a 5 ms time delay between each two copy I/Os on a system having a minimum time delay granularity of 15 ms, techniques herein may issue 3 data copy I/Os at a first point in time, introduce a 15 ms time delay and then issue 3 more data copy I/Os at a second point in time. In this manner, the desired average time delay of 5 ms between each pair of data copy I/Os may be achieved. It should be noted that in a system having a minimum time delay granularity, actual time delays may occur in amounts which approximate multiples of the minimum time delay granularity. For example, with a minimum time delay granularity of 15 ms, actual time delays may be introduced in 15 ms increments. In this manner, techniques described herein may be used to achieve an average desired time delay of a finer granularity, such as 1 ms or 5 ms, even though actually introduced time delays may occur in 15 ms increments (e.g., 15 ms, 30 ms, etc.).

An embodiment in accordance with techniques herein may calculate the desired average delay time between a pair of copy I/Os based on the following EQUATION 1:

$$\text{Delay time} = A - (B * \text{throttle}) \qquad \text{EQUATION 1}$$

A and B may be set to default values, such as, for example, $A=100$ and $B=1$, whereby A and B are numeric quantities, such as integer values, such that $A>B$, and $A>(B*\text{throttle})$. The value specified for "throttle" may vary with a desired level of relocation performance affecting the rate at which the copy I/Os will proceed. Using values of $A=100$ and $B=1$, the smaller the throttle value, the larger the delay time. Although typically, A and B may be set to default values used for all data storage systems, A and B may be adjustable in some embodiments such as by a system command during runtime to allow for any further needed customization of such values.

An embodiment may provide different values for throttle in EQUATION 1 depending on a specified desired level of relocation performance. For example, one embodiment may provide a user with three levels—HIGH, MEDIUM and LOW—whereby a user may select or specify one of the foregoing 3 levels designated the desired level of performance relocation. Each of the foregoing three levels may be associated with a different integer used as the value for the throttle parameter in EQUATION 1.

Referring to FIG. 4, shown is an example 300 of a table of different relocation performance levels and associated values that may be used in an embodiment in accordance with techniques herein. The example 300 includes a first column 302 of performance levels, a second column 304 of throttle values, a third column 306 of delay times, and a fourth column denoting an amount of time to relocate a single 1 GB slice of data assuming that each copy I/O copies 128 K bytes of data as noted above. Each row of table 300 specifies information associated with each different relocation performance level that may be selected. In this example, there are 3 levels as described above although an embodiment may include any suitable number of levels from which a user may specify a selection, for example, using a user interface, command line, in a configuration file, and the like. It should be noted that the amounts of time specified in column 308 for the various performance levels may represent minimum amounts of time for relocating a single 1 GB based on a total cumulative amount of approximate delay time with respect to relocating all 128K byte subportions of the 1 GB slice. The foregoing may be characterized as a minimum amount of time since actually performing the I/O takes additional time besides the noted cumulative delay time.

As denoted by row 310 when HIGH relocation performance is desired, the highest throttle value of 99 may be specified resulting in an average delay time between two I/Os of 1 ms. Based on the foregoing delay time of 1 ms and assuming that each copy I/O copies 128K bytes of data, it will take at least 8192 milliseconds or 8.192 seconds to relocate a 1 GB slice of data from a source to a target physical location. Specifying the HIGH relocation performance results in the full or maximum available rate at which relocation is performed.

As denoted by row 312 when MEDIUM relocation performance is desired, the second largest throttle value of 98 may be specified resulting in an average delay time between two I/Os of 2 ms. Based on the foregoing delay time of 2 ms and assuming that each copy I/O copies 128 K bytes of data, it will take at least 16, 384 milliseconds or 16.384 seconds to relocate a 1 GB slice of data from a source to a target physical location.

As denoted by row 314 when LOW relocation performance is desired, the smallest throttle value of 94 may be specified resulting in an average delay time between two I/Os of 6 ms. Based on the foregoing delay time of 6 ms and assuming that each copy I/O copies 128 K bytes of data, it will take at least 49, 152 milliseconds or 49.152 seconds (6 times the amount of time of 8.912 seconds specified for the HIGH rate) to relocate a 1 GB slice of data from a source to a target physical location.

A selected one of the throttle values 304 in the example 300 may be specified depending on the user selected performance level from 302. The selected throttle value from 304 based on the selected performance level from 302 may be used in connection with calculating delay time between two copy I/Os using EQUATION 1.

It should be noted that an embodiment may use different throttle values than as described herein for purposes of illustration. The particular throttle values used for different relocation performance levels may vary and may be determined, for example, through testing by a data storage system manufacturer.

What will now be described with reference to FIG. 5, flowchart 400, is further detailed processing that may be performed in an embodiment in accordance with techniques herein to control the rate or speed of the relocation processing to relocate or copy a data portion from a source to a target physical location in an embodiment in accordance with techniques herein. In an embodiment, the delay between copy I/Os may be introduced or implemented by issuing a call to a sleep API causing current code from which the call is made to suspend execution, such as for a requested number of milliseconds specified as a parameter in the call to the sleep API. The sleep API call is used in following paragraphs to implement the requested delay. However, other embodiments may use other techniques.

Figure 5:
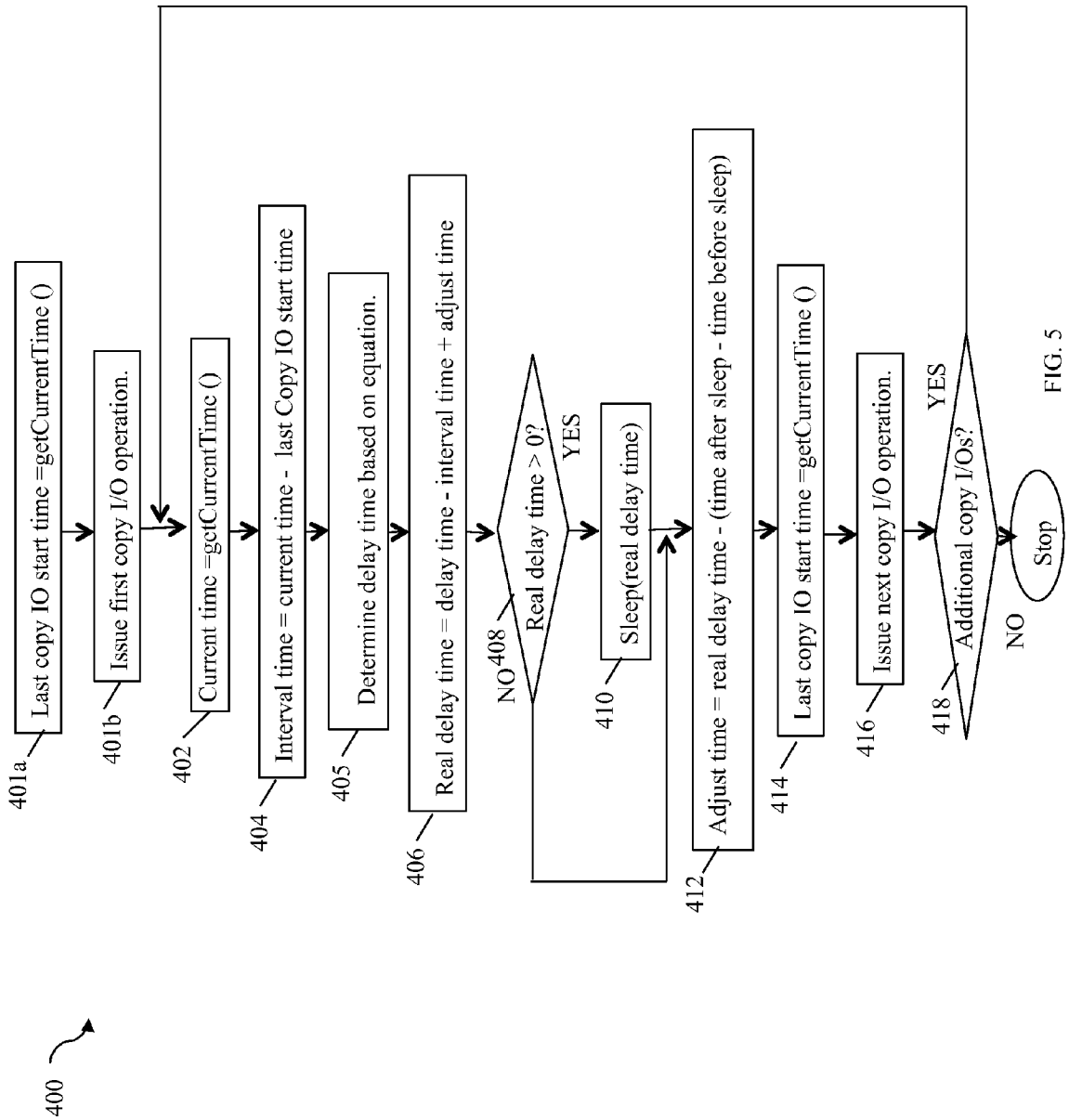
FIG. 5 is a flowchart of processing steps that may be performed in an embodiment in accordance with techniques herein.

In connection with processing of FIG. 5, it is assumed that an initial or first copy I/O is issued followed by introducing a first time delay prior to the next or second copy I/O. In step 401, a variable, last copy IO start time, may be assigned the current time denoting the time at which the first copy I/O operation is issued in step 401b. As illustrated, the current time may be obtained using an application programming interface (API) such as getCurrentTime, that may be included in the particular operating system upon which code is executing to perform the steps of FIG. 5. For example, the current time may be obtained from a system clock.

In step 402, the time is obtained and assigned to the variable "current time". As illustrated, step 402 may invoke the same API as described above in connection with step 401a. In step 404, interval time is calculated as the difference between the current time (obtained in step 402) and the last time a copy I/O was issued (as denoted by the variable last copy IO start time). At step 405, the delay time is determined such as using EQUATION 1 described above based on the throttle value that may vary in accordance with a desired level of relocation performance. It should be noted that the same value for delay time may be used for each iteration of processing of 400 and need only be calculated based on EQUATION 1 for the first iteration for the first time delay. An embodiment may store, such as in memory, the delay time calculated in step 405 of the first iteration as determined using EQUATION 1. Subsequent iterations of 400 for other time delays introduced between subsequently issued copy I/Os may retrieve and use the stored value of delay time. As noted elsewhere herein, the delay time of step 405 determined using EQUATION 1 may be characterized as the average desired delay time between copy I/Os.

In step 406, the "real delay time", representing the requested delay time (to be requested in step 410 below) for this iteration between copy I/Os, may be calculated. The real delay time may be characterized as the desired average delay time (determined previously in step 405 using EQUATION 1) which may be adjusted, as needed, based on two variables—interval time and adjust time. In step 406, real delay time requested in connection with the current copy I/O delay may be determined based on the following:

$$\text{real delay time} = \text{delay time} - \text{interval time} + \text{adjust time} \quad \text{EQUATION 2}$$

whereby delay time is the desired average delay time determined using EQUATION 1, as in step 405;

interval time is determined as from step 404 which represents the actual amount of time that has lapsed since the last copy I/O was issued; and adjust time takes into account any amount by which one or more prior actual time delays between copy I/Os (from the previous iteration(s) of 400) are above or below the desired average delay time (as determined using EQUATION 1, step 405). It should be noted that adjust time is a value determined in step 412 described below from the immediately prior iteration of processing for the previous time delay between copy I/Os. If this is the first iteration of 400 (e.g., for the first time delay introduced following the first initial copy I/O), then a value of zero (0) may be used as the adjust time. Otherwise, the value of adjust time as determined in step 412 from the previous iteration may be used.

To further illustrate as an example, assume that a system has a minimum time delay granularity of 15 ms and an average desired delay time=1 ms (as calculated using EQUATION 1, step 405). In this case, a first iteration of performing the steps of 400 may introduce an actual time delay elapsing of 15 ms. In other words, the processing may sleep for an actual duration of 15 ms. Adjust time may be −14 ms denoting the additional amount of delay time of 14 ms introduced by the first iteration.

In step 408, a determination is made as to whether real delay time is greater than zero (0). If step 408 evaluates to no, control proceeds to step 412. If step 408 evaluates to yes, control proceeds to step 410 to invoke the sleep function requesting a delay by suspending processing for a requested amount of time denoted by real delay time.

As noted above, the variable real delay time may be negative whereby when negative, real delay time indicates that the actual amount of sleep delay time that has elapsed is greater than the request sleep delay time (as denoted by the variable real delay time in the sleep API call of step 410).

At step 412, adjust time may be calculated as follows:

$$\text{Adjust time} = \text{real delay time} - (\text{time after sleep} - \text{time before sleep}) \quad \text{EQUATION 3}$$

whereby real delay time is the requested delay time for the current iteration of 400 as determined in step 406;

time after sleep is the actual time, such as the system clock time, after completing step 410 (e.g., when the processing resumes after the actual delay time has elapsed); and time before sleep is the actual time, such as system clock time, prior to step 410 (e.g., when the sleep function is invoked to suspend or delay issuing a next copy I/O).

In this manner, "(time after sleep−time before sleep)" represents the actual amount of time delay introduced by invoking the sleep function in step 410 (e.g., the quantity (time after sleep−time before sleep) represents the actual amount of sleep time or actual amount of time which the processing was suspended due to the sleep function invocation in step 410). It should be noted that various factors (e.g., system clock granularity, system workload, implementation of the sleep function, etc.) in an embodiment may cause the actual amount of time which elapses (e.g., the quantity (time after sleep−time before sleep)) as a result of the sleep function invocation in step 410 to differ from the particular amount of sleep time requested (e.g., real delay time—specified as a parameter in the sleep function invocation). In one embodiment, the quantity represented by (time after sleep−time before sleep) may be determined by performing calls to the getCurrentTime API as described in connection with step 402. In particular, a call to the getCurrentTime API may be performed both immediately prior to invoking the sleep function in step 410 and also immediately after step 410 completes (e.g., returns from the sleep function in step 410).

It should be noted that if there is no sleep time whereby step 410 is not performed since step 408 evaluates to no, then the quantity "time after sleep−time before sleep" may be set to zero (0), as used in determining adjust time in step 412.

To further illustrate adjust time determined during the first iteration, consider the above-mentioned example where the system has a minimum time delay granularity of 15 ms and an average desired delay time=1 ms (as calculated using EQUATION 1, step 405). In the first iteration, step 406 may determine real delay time as 1 ms (e.g., delay time=1 ms and assume for simplicity that both interval time=0 and adjust time=0 since there is no previous iteration or previous time delay). Since real time delay is 1 ms, step 408 evaluates to yes and step 410 is performed. As noted above, assume that the invocation of step 410 results in sleeping 15 ms such that the quantity (time after sleep−time before sleep)=15 ms even though the requested sleep time may be 1 ms (as represented by real time delay). At step 412, adjust time may be determined as −14 ms (e.g., the difference between 1 ms (real time delay from step 408 representing the requested sleep time delay) and 15 ms (the quantity "time after sleep−time before sleep") representing the amount of actual sleep time delay).

Returning to FIG. 5, at step 414, the current time is obtained and assigned to the variable "last copy IO start time". The current time may be obtained using a system API such as described in connection with step 402. As noted above, the last copy IO start time determined in step 414 of an iteration of flowchart 400 processing may be used in step 404 of the next subsequent iteration of flowchart 400 processing.

At step 416, the next copy I/O operation is issued. At step 418, a determination is made as to whether any additional copy I/Os are needed to complete copying the data portion. If so, control proceeds to step 402 for the next iteration of processing. Otherwise, if step 418 evaluates to no, processing to copy and thereby relocate the data portion stops. When step 418 evaluates to no, it means that processing for a data portion being relocated has completed.

Figure 6:
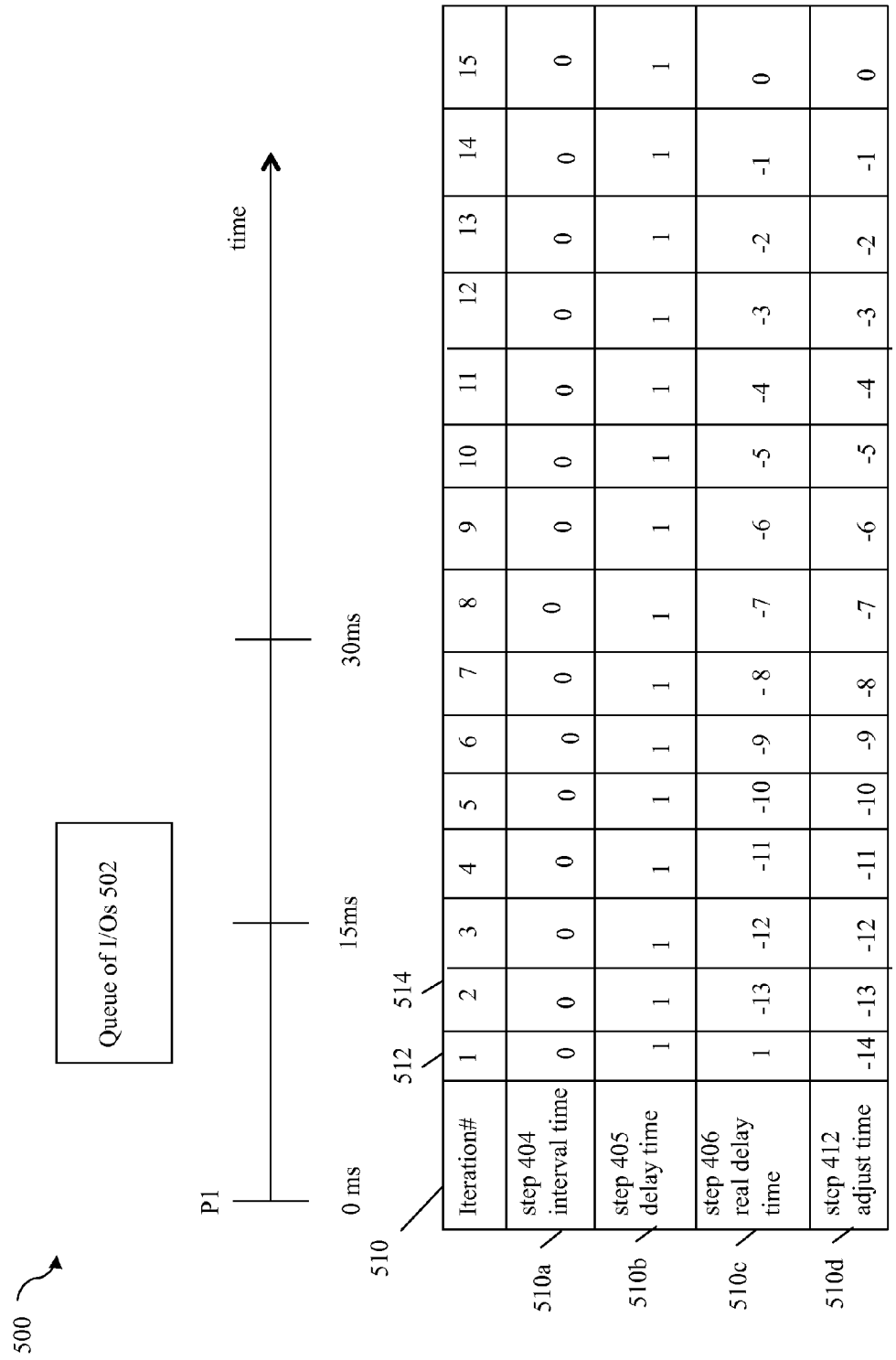
FIG. 6 is an example illustrating in more detail performing processing steps of FIG. 5 in an embodiment in accordance with techniques herein.

Based on the foregoing, "adjust time" is the variable used in processing to determine a current amount of delay (sleep) time to request (e.g., used to determine real delay time) which accounts for any time by which one or more previous actual delay times are above or below the desired average delay time (as determined using EQUATION 1, step 405). In this manner, adjust time may be used to facilitate obtaining an average desired delay time across multiple time delays whereby the desired average time delay may be less than minimum time delay. In one aspect, the adjust time determined in step 412 of iteration N (N being an integer >0) of flowchart 400 processing may represent an accumulated amount of time (positive, zero or negative) that is carried forward to one or more subsequent iterations to facilitate obtaining an average desired delay time (as represented by EQUATION 1). To illustrate, consider the above-noted example where the desired average delay time as determined using EQUATION 1 is 1 ms, the minimum time delay is 15 ms, and the actual amount of sleep or delay time (denoted by "time after sleep"−"time before sleep") is 15 ms. Thus, adjust time may be used to track the overage in delay time taken of 14 ms. The overage in delay time of 14 ms already taken (represented by a negative adjust time value) may then be carried forward and accounted for in connection with subsequent iterations of the flowchart 400 for any subsequent delay time introduced between subsequent copy I/Os. More generally, the variable adjust time may be used to track any accumulated overage or underage (e.g., deficiency) in delay time already taken whereby adjust time applies or carries such overage or underage to calculations determining subsequent requested delay times Referring to FIG. 6, shown is an example 500 illustrating use of techniques herein that may be performed in an embodiment in accordance with techniques herein. Element 502 may represent a queue of pending copy I/Os which are sequentially issued to copy a data portion, such as a 1 GB slice of data. Reference will be made to steps of FIG. 5 to further illustrate described processing. Also included in the example 500 is a table 510 including 15 columns of values whereby each such column denotes different variable values for indicated processing iterations of the flowchart 400 of FIG. 5. For example, column 512 indicates values for different variables used in the processing steps of FIG. 5 for the first iteration and column 514 indicates values for different variables used in the processing steps of FIG. 5 for the second iteration. Each row of the table 510 represents values for a single variable for different processing iterations of the flowchart 400 of FIG. 5. Row 510a indicates values for interval time as determined in step 404. Row 510b indicates values for delay time as determined in step 405. Row 510c indicates values for real delay time (requested amount of sleep delay time) as determined in step 406. Row 510d indicates values for adjust time as determined in step 412.

With reference to FIGS. 5 and 6, a first copy I/O may be issued in step 401b which is represented by point P1 on the time line of FIG. 6. For the first iteration of processing as denoted by 512, in step 404, assume that the interval time rounds to zero milliseconds (ms) meaning that the amount of time which has lapsed between processing of steps 401a and 402 is negligible or approximately 0 ms. At step 405, the delay time calculated by EQUATION 1 may be 1 ms. At step 406 the real delay time is determined as 1 ms since both interval time and adjust time are zero. Step 408 evaluates to yes so that step 410 is performed with a real delay time, or requested sleep delay time, of 1 ms. At step 412, adjust time is determined. In this example iteration, let the quantity of "time after sleep-time before sleep"=15 ms whereby adjust time is determined as −14 ms. In this case, the minimum time delay may be 15 ms as described above so that even though a 1 ms sleep delay time is requested in step 410, processing is suspended for the minimum time of 15 ms. Since there is an average desired delay time of 1 ms (as represented by delay time calculated using EQUATION 1 in step 405) and have actually taken a delay of 15 ms, an additional delay of 14 ms was taken as reflected by adjust time. At step 414, last copy IO start time is updated to now represent the time at which the second subsequent copy I/O is then issued in step 416. Step 418 evaluates to yes and processing proceeds to step 402 for the second iteration.

In the second iteration of flowchart 400 processing as represented by 514, assume interval time is again 0 ms and the delay time at step 405 is 1 ms. Step 406 determines the real delay time as −13 ms (e.g., 1 ms-14 ms) causing step 408 to evaluate to no whereby step 410 is not performed. In this second iteration, there is no call to the sleep API. In step 412, adjust time is updated to −13 ms to represent the current residual amount of delay time already taken.

In a similar manner as just described, subsequent iterations of processing of the flowchart 400 of FIG. 5 may be performed in accordance with the values as illustrated in the table 510. As can be seen from the table 510, values of adjust time in 510d decrease each iteration for each subsequent copy I/O performed in step 416. In each such iteration subsequent to the first iteration up to the illustrated 15$^{th}$ iteration, there is no call to the sleep function so that the actual amount of sleep time delay of 15 ms performed on the first iteration is thereby averaged over he illustrated 15 iterations to obtain the desired delay time of 1 ms (as denoted by 510b calculated using EQUATION 1).

Techniques herein may be used for a variety of different purposes where copy I/Os are performed to copy data from a source location to a target location. One such use is for relocating a data portion such as in connection with performing data movement optimizations (e.g. promotions and/or demotions) to relocate data from a source location of a source device of a first storage tier to a target location of a target device of a second storage tier. Other exemplary uses of techniques herein whereby data copying may be performed as a background task having lower priority than other processing such as servicing I/O requests received from a host may include, for example, defragmentation, data storage system internal processing to relocate file system blocks, and the like.

Techniques herein provide for controlling the data copy I/O processing while limiting adverse effects upon other higher priority processing operations such as, for example, servicing user data I/O requests received from a host. Such techniques herein provide for achieving an average desired time delay which can be configured in accordance with criteria including a user-specified relocation performance level.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for copying data comprising:
  receiving a request to copy a data portion from a source location of a first physical device to a target location of a second physical device;
  determining a desired average delay time in accordance with a plurality of values including a throttle value affecting a rate at which data is copied from the source location to the target location;
  partitioning the request into a plurality of subrequests, said data portion being partitioned into a plurality of subportions, each of the plurality of subrequests copying one of the plurality of subportions; and
  performing said plurality of subrequests whereby a time delay is introduced between at least two of the plurality of subrequests and whereby an average time delay with respect to each pair of consecutively issued subrequests of said plurality of subrequests is said desired average time delay.

2. The method of claim 1, wherein said throttle value is determined in accordance with a desired level of copying performance, said desired level of copying performance being one of a plurality of performance levels that is user specified.

3. The method of claim 2, wherein the desired average time delay, delay time, is determined as follows:

$$\text{delay time} = A - (B^* \text{throttle}),$$

whereby A and B are numeric quantities such that A>B, throttle is said throttle value, and whereby A>(B*throttle).

4. The method of claim 2, wherein the plurality of performance levels includes three performance levels.

5. The method of claim 1, wherein said plurality of subrequests includes more than two subrequests and a first time delay is introduced between only one pair of said plurality of subrequests to obtain said desired average time delay with respect to time delays introduced between subrequest pairs of said plurality of subrequests.

6. The method of claim 5, wherein the first time delay denotes an amount of time having a first time granularity and said desired average time delay has a second time granularity, said first time granularity being larger than said second time granularity.

7. The method of claim 5, wherein said first time delay is larger than said desired average time delay.

8. The method of claim 1, wherein said request is a request to relocate data in connection with a data movement optimization performed in accordance with a current workload of the data portion.

9. The method of claim 8, wherein the data movement optimization is performed in a data storage system including a plurality of different storage tiers having different performance characteristics.

10. The method of claim 9, wherein said data movement optimization is a promotion whereby the source device is included in a first of the plurality of storage tiers having a lower performance classification ranking than a second of the plurality of storage tiers including the target device.

11. The method of claim 9, wherein said data movement optimization is a demotion whereby the source device is included in a first of the plurality of storage tiers having a higher performance classification ranking than a second of the plurality of storage tiers including the target device.

12. The method of claim 1, further comprising:
  issuing a first of the plurality of subrequests;
  determining an interval time as an amount of time that has elapsed since issuing said first subrequest;
  determining a requested time delay amount in accordance with said desired average delay time, said interval time, and an adjust time, said adjust time denoting any accumulated overage or underage in actual delay time introduced between previously issued subrequests of the plurality of subrequests;
  determining whether said requested time delay amount is greater than zero; and responsive to determining said requested time delay amount is greater than zero, issuing a delay request to introduce a time delay of said request time delay amount prior to issuing a second of said plurality of subrequests, and otherwise not issuing a delay request to introduce a time delay prior to issuing a second of said plurality of subrequests.

13. The method of claim 12, further comprising:
determining an updated values for said adjust time, wherein if said delay request is issued, said updated value is equal to a difference between the requested time delay amount and an actual amount of time delay introduced as a result of said delay request, wherein if said delay request is not issued, said updated value is equal to said requested time delay amount.

14. The method of claim 13, wherein if said adjust time at a point in time is negative, said adjust time denotes an overage in actual delay time already introduced between subrequest prior to said point in time whereby said overage is carried forward in connection with determining whether to request a time delay prior to issuing a next subsequent one of the plurality of subrequests.

15. The method of claim 13, wherein if said adjust time at a point in time is positive, said adjust time denotes an underage or deficiency in actual delay time that has not been introduced prior to said point in time whereby said underage or deficiency is carried forward in connection with determining whether to request a time delay prior to issuing a next subsequent one of the plurality of subrequests and in connection with determining an amount of time delay to request prior to issuing a next subsequent one of the plurality of subrequests.

16. The method of claim 1, wherein said copying data is performed as a background task in a data storage system, said background task having a lower priority than one or more other tasks, said one or more other tasks including servicing I/O requests received at the data storage system from one or more hosts.

17. A non-transitory computer readable medium comprising code stored thereon that, when executed, performs a method for copying data comprising:
receiving a request to copy a data portion from a source location of a first physical device to a target location of a second physical device;
determining a desired average delay time in accordance with a plurality of values including a throttle value affecting a rate at which data is copied from the source location to the target location;
partitioning the request into a plurality of subrequests, said data portion being partitioned into a plurality of subportions, each of the plurality of subrequests copying one of the plurality of subportions; and
performing said plurality of subrequests whereby a time delay is introduced between at least two of the plurality of subrequests and whereby an average time delay with respect to each pair of consecutively issued subrequests of said plurality of subrequests is said desired average time delay.

18. The non-transitory computer readable medium of claim 17, wherein said throttle value is determined in accordance with a desired level of copying performance, said desired level of copying performance being one of a plurality of performance levels that is user specified.

19. The non-transitory computer readable medium of claim 18, wherein the desired average time delay, delay time, is determined as follows:

$$\text{delay time} = A - (B * \text{throttle}),$$

whereby A and B are numeric quantities such that A>B, throttle is said throttle value, and whereby A>(B*throttle), and wherein the plurality of performance levels includes three performance levels.

20. A system comprising:
one or more hosts which send I/O requests to a data storage system; and
said data storage system including a set of one or more processors programmed to perform processing for copying data, said processing including:
receiving a request to copy a data portion from a source location of a first physical device to a target location of a second physical device;
determining a desired average delay time in accordance with a plurality of values including a throttle value affecting a rate at which data is copied from the source location to the target location;
partitioning the request into a plurality of subrequests, said data portion being partitioned into a plurality of subportions, each of the plurality of subrequests copying one of the plurality of subportions; and
performing said plurality of subrequests whereby a time delay is introduced between at least two of the plurality of subrequests and whereby an average time delay with respect to each pair of consecutively issued subrequests of said plurality of subrequests is said desired average time delay.

* * * * *